(12) United States Patent
Foght

(10) Patent No.: US 11,051,485 B2
(45) Date of Patent: Jul. 6, 2021

(54) STACKABLE AND PALLET-TRANSPORTABLE CHEESE LOG FORMING AND HOLDING TRAY

(71) Applicant: Portage Plastics Corporation, Portage, WI (US)

(72) Inventor: Michael A. Foght, Waunakee, WI (US)

(73) Assignee: Portage Plastics Corporation, Portage, WI (US)

( * ) Notice: Subject to any disclaimer, the term of this patent is extended or adjusted under 35 U.S.C. 154(b) by 88 days.

(21) Appl. No.: 15/937,847

(22) Filed: Mar. 27, 2018

(65) Prior Publication Data

US 2018/0288961 A1    Oct. 11, 2018

Related U.S. Application Data

(60) Provisional application No. 62/477,426, filed on Mar. 27, 2017, provisional application No. 62/478,034, filed on Mar. 28, 2017.

(51) Int. Cl.
*A01J 25/13* (2006.01)
*B65D 1/36* (2006.01)
(Continued)

(52) U.S. Cl.
CPC ............... *A01J 25/13* (2013.01); *B65D 1/36* (2013.01); *B65D 21/0215* (2013.01);
(Continued)

(58) Field of Classification Search
CPC .......... A01J 25/13; B65D 85/76; B65D 1/36; B65D 71/70; B65D 21/0233;
(Continued)

(56) References Cited

U.S. PATENT DOCUMENTS 2,590,510 A * 3/1952 Cohen .................... A01J 25/13
100/195
3,191,796 A * 6/1965 Schwartz ............. B65D 21/045
220/23.6
(Continued)

FOREIGN PATENT DOCUMENTS

GB         1229174 A  *  4/1971  ............. F25C 1/243

*Primary Examiner* — Leith S Shafi
(74) *Attorney, Agent, or Firm* — Boyle Fredrickson S.C.

(57) ABSTRACT

A tray that eliminates the need for wrapping or packaging edible food articles that are in a malleable form, such as when made or otherwise produced, with the tray formed with at least a plurality of pairs of article holding compartments each three dimensionally contoured so as to define an edible food article mold that shapes or forms an edible food article received therein that is in a formable or moldable state so as to substantially conform at least a portion of the edible food article to the shape of the three-dimensional contour of the mold of the compartment in which the article is received. A preferred embodiment of the tray has at least a plurality of pairs of elongate article holding compartments that are generally parallel with one another with the article shaping or forming mold defined by each compartment formed of a compartment sidewall that has a concavely curved cross-section that preferably is generally semicircular in a transverse cross-section. In a preferred embodiment, each compartment has a mouth through which an edible food article enters during the filling of the tray with the mouth preferably defined by opposed portions of the generally semicircular compartment sidewall that are generally parallel to one another and which preferably can be obtuse the angled relative to one another to define a guide chute that guides the article into a desired position and/or orientation in the mold of the compartment that optimizes forming or shaping of the article before it cools, dries, cures or otherwise hardens thereby setting or fixing its shape memory so
(Continued)

as to substantially conform at least a part of the shape of the article disposed in contact with the sidewall with the mold of the compartment in which the article is received.

25 Claims, 4 Drawing Sheets

(51) Int. Cl.
 A23C 19/068 (2006.01)
 B65D 71/70 (2006.01)
 B65D 21/02 (2006.01)
 B65D 85/30 (2006.01)
 B65D 85/76 (2006.01)
(52) U.S. Cl.
 CPC ..... B65D 21/0216 (2013.01); B65D 21/0233 (2013.01); B65D 71/70 (2013.01); B65D 85/30 (2013.01); B65D 85/76 (2013.01); A23C 19/0684 (2013.01); B65D 2543/00296 (2013.01)
(58) Field of Classification Search
 CPC ............ B65D 21/0216; B65D 21/0215; B65D 85/30; B65D 2543/00296; A23C 19/0684; F25C 1/04; F25C 1/045; F25C 1/06; F25C 1/22; F25C 1/24; F25C 1/243; F25C 1/246
 USPC .......................................................... 249/203
 See application file for complete search history.

(56) References Cited

U.S. PATENT DOCUMENTS

| | | | | |
|---|---|---|---|---|
| 3,197,058 A | * | 7/1965 | Hale | F25D 25/005 220/23.6 |
| 3,272,371 A | * | 9/1966 | Weiner | B65D 71/70 206/511 |
| 3,700,373 A | * | 10/1972 | Fowler | A01J 25/13 425/195 |
| 3,841,210 A | * | 10/1974 | Brog | A01J 25/13 99/456 |
| 4,676,475 A | * | 6/1987 | Grandin | A23C 19/0285 249/105 |
| 2011/0252978 A1 | * | 10/2011 | Shoshan | A23L 13/03 99/441 |
| 2014/0353466 A1 | * | 12/2014 | Foster | F25C 1/24 249/203 |

* cited by examiner

STACKABLE AND PALLET-TRANSPORTABLE CHEESE LOG FORMING AND HOLDING TRAY

CROSS REFERENCE

Pursuant to 35 U.S.C. § 119(e), this application claims all benefits to and priority in U.S. Provisional Application Ser. No. 62/477,426, filed on Mar. 27, 2017, and U.S. Provisional Application Ser. No. 62/478,034, filed on Mar. 28, 2017, the entirety of each of which is hereby expressly incorporated by reference herein.

FIELD

The present invention is directed to a stackable multi-compartment tray for protectively holding relatively delicate malleable material, and more particularly to a stackable and pallet transportable cheese log holding tray equipped with three-dimensional shape-memory supporting compartments, used to not only hold freshly produced cheese logs, but also impart them with a desirable shape memory while held in the compartments and that the compartments help retain while held in the compartments.

BACKGROUND

In the past, transporting highly malleable articles having a desired three-dimensional shape or contour while their shape memory has not yet set or become fixed has proven to be a tricky and undesirable challenge because even the slightest jolt, bump or jostle can adversely change the shape of the article leading to it being scrapped or returned for rework or recycling. One highly malleable article which posed this problem in the past was a malleable edible product that was a cheese article that more preferably was a generally cylindrical extruded mozzarella cheese log. While such cheese articles like mozzarella cheese logs are viscous and can even be flowable at room temperature as they are typically extruded at temperatures higher than room temperature, typically higher than eighty-five degrees Fahrenheit, and even more typically higher than ninety degrees Fahrenheit making. Until the cheese logs sufficiently cool, any sudden or sharp movement, jerk, jolt, bump, shock or the like can bend the log, tear the log, dent the log, twist the log, or otherwise unacceptably deform the log until it has enough time to adequately cure and harden to a substantially solid form where the log is no longer in danger of being damaged or deformed.

What is needed is a package which not only can receive and hold such a highly malleable article like mozzarella cheese logs during manufacturing of the logs, but which also is a package in which the cheese logs will retain their shape including during shipping or transport.

SUMMARY

The present invention is directed to a package that preferably is a tray that solves one or more of the aforementioned problems and prevents such damage as it has recessed compartments formed with a desired three-dimensional shape or contour that at least partially molds such soft malleable articles into a desired shape and maintains their molded shape thereafter by supporting the desired three-dimensional shape or contour of each molded article during storage, shipping, transport and use. In a preferred embodiment, the present invention is directed to a tray having compartments into which a soft malleable material, preferably a soft malleable cheese that more preferably is mozzarella is discharged during making of the cheese so that the soft cheese received in each tray compartment is molded by the three-dimensional shape or contour of the compartment into a desired three-dimensional shape or contour.

Such a tray of the present invention is formed, preferably molded, more preferably thermoformed having such recessed compartments formed with such a desired three-dimensional shape or contour to impart a desired shape or form onto at least a portion of the soft cheese discharged into the compartments during soft cheese making that is substantially complementary or substantially conforms to the shape of the compartment. A tray with such three dimensionally contoured or shaped compartments allows the soft cheese product to remain in the compartments thereby molding the soft cheese product substantially into the shape of the compartment while the soft cheese product cools and sets or cures hardening into a substantially solid cheese article which can then be removed. When suitably cooled, dried, cured and/or hardened, the substantially solid cheese article can be removed, and wrapped or otherwise packaged for retail, consumer or commercial sale. If desired, the substantially solid cheese article can also be removed and used as a constituent or ingredient of another food product, such as a pizza or the like.

In one preferred embodiment, the soft malleable material is a soft cheese product that is mozzarella discharged in a highly malleable form during making of a three-dimensionally formed or shaped mozzarella cheese product or article that is received in respective mozzarella cheese molding compartments of a tray of the present invention. One preferred method of making such soft cheese that preferably is a mozzarella cheese where the cheese is extruded at a temperature higher than room temperature which can be extruded at or greater than one or more of the temperatures disclosed therein is disclosed in U.S. Pat. No. 5,925,398, the entire disclosure of which is expressly incorporated herein by reference. If desired, such soft cheese, preferably mozzarella cheese, can also be made by extruding the cheese at a temperature higher than room temperature and which can be extruded at or greater than room temperature, preferably at or greater than a temperature of at least 70 degrees Fahrenheit. In a preferred method and embodiment, the soft cheese is mozzarella cheese that is extruded at a temperature of at least 75 degrees Fahrenheit (at least about 25 degrees Celsius or at least about 77 degrees Fahrenheit), at least 90 degrees Fahrenheit (at least about 40 degrees Celsius or at least about 104 degrees Fahrenheit), at least 120 degrees Fahrenheit (at least about 50 degrees Celsius or at least about 122 degrees Fahrenheit), or at least 140 degrees Fahrenheit (at least about 60 degrees Celsius).

Such a tray in accordance with the present invention not only is thermoformed out of a food grade plastic that preferably is APET that enables the as-extruded soft cheese mozzarella to be extruded in its hot, viscous and highly malleable state into compartments of the tray that mold them into generally elongate and cylindrical cheese logs, but is a mozzarella cheese-log holding tray that is configured to be stackable upon one or more other such mozzarella cheese-log holding trays, including on pallets, enabling large quantities of extruded mozzarella cheese logs to be produced and delivered palletized. Such a cheese molding compartment equipped tray of the present invention not only enables extruded cheese, preferably extruded mozzarella cheese to be extruded directly into cheese shape forming compartments that preferably are generally cylindrical cheese log forming compartments directly in contact with the cheese during molding and curing but is a tray that is stackable including while carried by or on a pallet enabling the cheese to be delivered to a customer while still curing or solidifying in the pallet compartments without damaging the molded cheese.

In a preferred tray embodiment, the tray compartments are defined by a curved compartment sidewall having a generally semicircular cross-section or contour that can be and preferably is substantially smooth providing a cheese log shape mold or molding compartment that molds the hot, soft and viscous or flowable mozzarella extruded into the compartments into elongate generally cylindrical cheese logs that solidify in the compartments imparting to them a permanent shape memory or sold shape that is elongate and generally cylindrical. Such hardening, curing, solidification and/or shape memory fixing or setting of the cheese log begins to occur from the time when poured, extruded or otherwise discharged into compartments of such a tray of the invention but can and preferably does occur while stacked trays containing such cheese are being stacked, after having been stacked, palletized, and shipped or delivered, such as to a customer who can either remove and use the cheese logs, package and ship them, or otherwise process or utilize them in some other manner.

In a preferred embodiment, the mozzarella cheese is needed to maintain a certain diameter and length to allow logs of cheese to feed through a gravity fed magazine. In one preferred embodiment, the cheese logs can be and preferably are fed through such a gravity fed magazine into respective cheese log shape molding compartments of trays of the invention being filled, stacked and palletized. When extruded, the cheese is at least slightly warm and will not keep its round shape unless molded until the cooling process is complete such that the curved compartment sidewalls of the compartments of each tray help support and retain the shape of the generally cylindrical cheese logs until they sufficiently cool and suitably harden or cure. Such a tray of the present invention is not only a shape memory supporting, shape molding and/or shape memory setting tray, but the tray also is a shipping tray enabling shipping of cheese logs held in the tray to a desired destination. In addition, such a tray of the present invention is stackable thereby allowing for stacking of filled trays without damaging the roundness of the logs of cheese during packaging, shipping, transport, delivery and subsequent use or consumption. As such, the present invention contemplates a plurality, preferably at least a plurality of pairs, i.e., at least three, of stacked filled trays each filled with at least a plurality of cheese logs, forming a pallet-carried cheese log shipping stacked tray assembly that enables large quantities of cheese logs to be carried by the stacked trays and shipped altogether at once.

The tray is made of a food grade moldable material that preferably is a plastic. Each tray is preferably made of APET as it is a food grade plastic moldable material that preferably is thermoformable that also is U.S. Food and Drug Administration approved or compliant for use with food products like mozzarella and other types of cheese which are warm, soft and/or otherwise malleable upon production and initial packaging in compartments of such a tray of the invention. In addition, APET produces a tray of the invention that is suitably stiff, economical in cost, environmentally friendly, can be and preferably is reusable, tough, durable and easy to use and also simple to dispose of when spent.

After forming of empty trays constructed in accordance with the invention, the empty trays are sent to an end user, such as a food processor or cheese maker, who will fill them with soft cheese to mold into such cheese logs that also remain in the trays enabling them to be shipped using the trays to another food processor who then uses the cheese logs in the making of another food products. In a preferred embodiment, the trays are configured or otherwise formed so they employ an 0 degree stacking orientation or configuration when empty, with each empty tray rotated or oriented 0 degrees relative to the empty tray below. This advantageously enables empty trays to be stacked in a manner to produce an empty stacked compact height empty tray assembly of 2, 3, 4, 5 or more empty trays of relatively low or compact stack height to optimize the total number of empty trays that can be nested and shipped, such as back to the original food processor, e.g., cheese maker, after emptied to be reloaded with more cheese logs. When filled with cheese logs, the filled trays are formed or otherwise configured with stacking features configured when they are stacked at a 180-degree stacking orientation or configuration relative to the tray above and below it in order to maintain sufficient separation between trays to protect the cheese logs when filled with cheese logs. In a preferred embodiment, the trays are therefore further configured to be filled and stacked in a manner where the filled tray is rotated or oriented 180 degrees relative to the filled tray below in order to stack the filled trays to produce a filled stacked greater height filled tray assembly of 2, 3, 4, 5 or more filled trays in height carried by a single pallet that has a relatively low stack height while still protecting the cheese logs in each tray by disposing each log in between stacked trays thereby optimizing the total amount or volume of cheese logs that can be shipped using such stacked filled trays mounted to or carried by a pallet.

In order to keep the material thickness, preferably APET material thickness, of the trays to an optimal minimum to minimize tray cost while optimizing tray sidewall strength, a plurality of rib-strengthened regions each formed of a plurality of pairs, i.e. at least three, elongate and generally parallel sidewall stiffening and strengthening ribs are formed in each sidewall of each tray. Recessed finger areas are preferably also formed in or on each end of each cheese log molding and/or holding compartment to facilitate removal of a cheese log from the compartment when unloading filled trays. In order to produce mozzarella cheese logs having a desired diameter, such as preferably a forty-four millimeter diameter cheese log, the diameter of each cheese log molding and/or holding compartment formed in each tray is critical including to optimize the number of cheese log molding and/or holding compartments formed in a generally rectangular, e.g., square, tray of the present invention having a size about the same as that of a conventional forty inch by forty-eight inch standard pallet thereby maximizing cheese log carrying pallet area, space and/or volume and thereby maximizing the number of cheese logs carried by each pallet-carried tray.

Such a tray constructed in accordance with the present invention advantageously eliminates the need for wrapping or packaging edible food articles that are in a malleable form, such as when made or otherwise produced, with the tray formed with at least a plurality of pairs of article holding compartments each three dimensionally contoured so as to define an edible food article mold that shapes or forms an edible food article received therein that is in a formable or moldable state so as to substantially conform at least a portion of the edible food article to the shape of the three-dimensional contour of the mold of the compartment in which the article is received. A preferred embodiment of such a tray of the invention has at least a plurality of pairs of elongate article holding compartments that are generally parallel with one another with the article shaping or forming mold defined by each compartment formed of a compartment sidewall that has a concavely curved cross-section that preferably is generally semicircular in a transverse cross-section. In a preferred embodiment, each compartment has a mouth through which an edible food article enters during the filling of the tray with the mouth preferably defined by opposed portions of the generally semicircular compartment sidewall that are generally parallel to one another and which preferably can be obtuse the angled relative to one another to define a guide chute that guides the article into a desired position and/or orientation in the mold of the compartment that optimizes forming Or shaping of the article before it cools, dries, cures or otherwise hardens thereby setting or fixing its shape memory so as to substantially conform at least a part of the shape of the article disposed in contact with the sidewall with the mold of the compartment in which the article is received.

Various other features, advantages, and objects of the present invention will be made apparent from the following detailed description and any appended drawing.

DRAWING DESCRIPTION

One or more preferred exemplary embodiments of the invention are illustrated in the accompanying drawings in which like reference numerals represent like parts throughout and in which.

Figure 1:
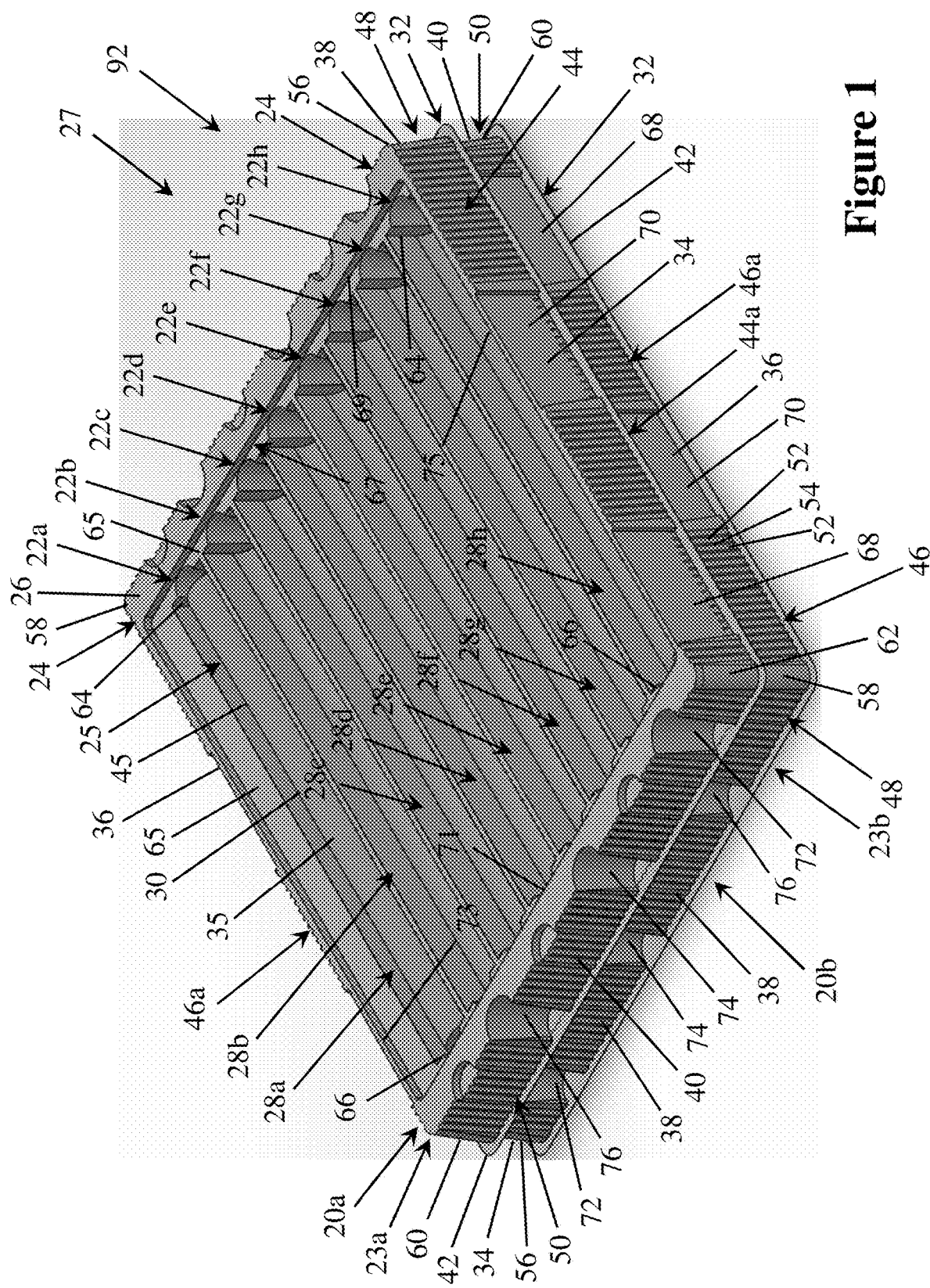
FIG. 1 is a lop perspective view of a set of stacked trays each formed with shape-memory forming or retaining compartments for each holding, forming and shape-memory setting an article malleable when loaded that preferably is a freshly formed mozzarella cheese log.
Figure 2:
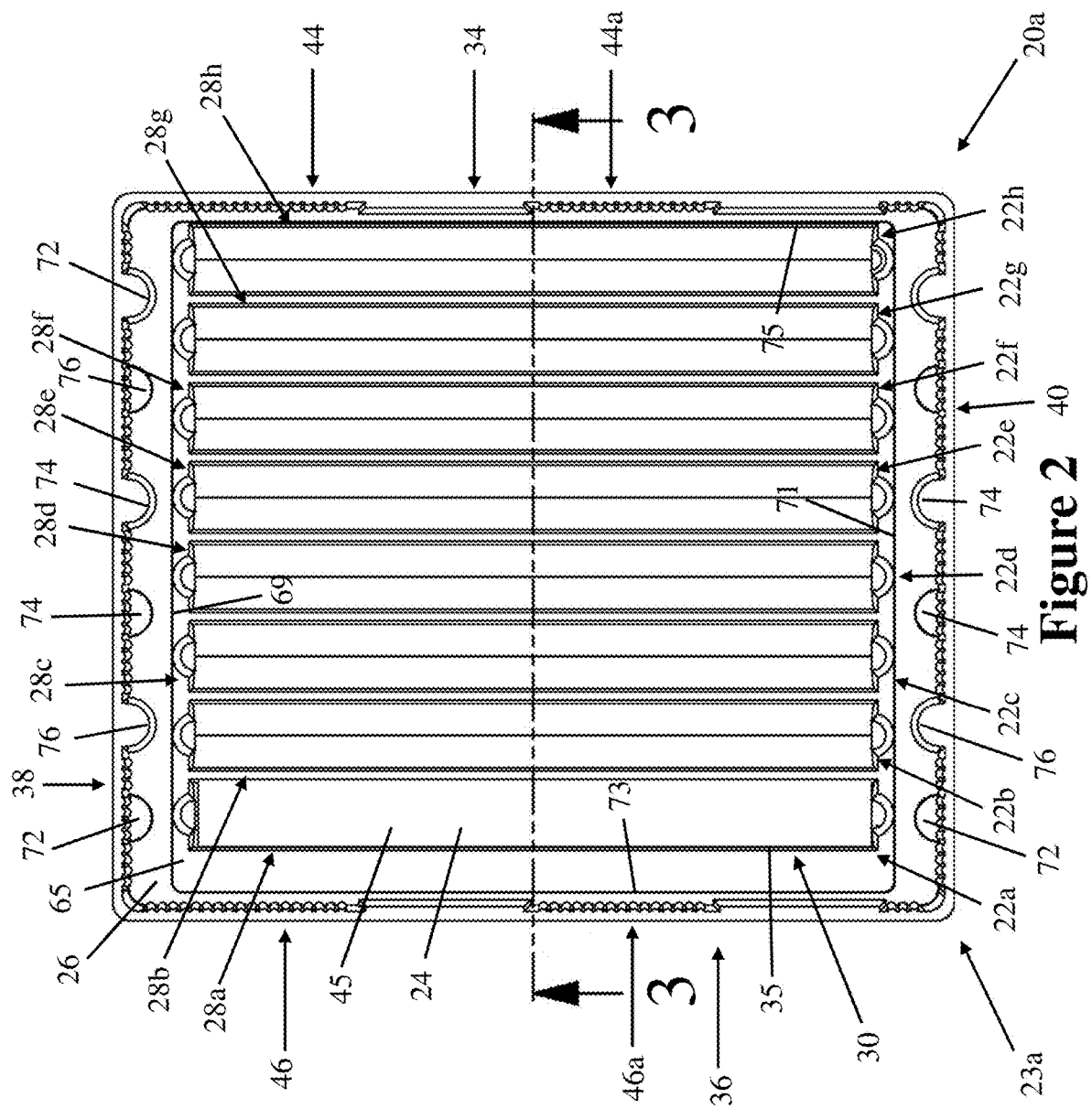
FIG. 2 is a top plan view of the stacked trays of the present invention of FIG. 1.
Figure 3:
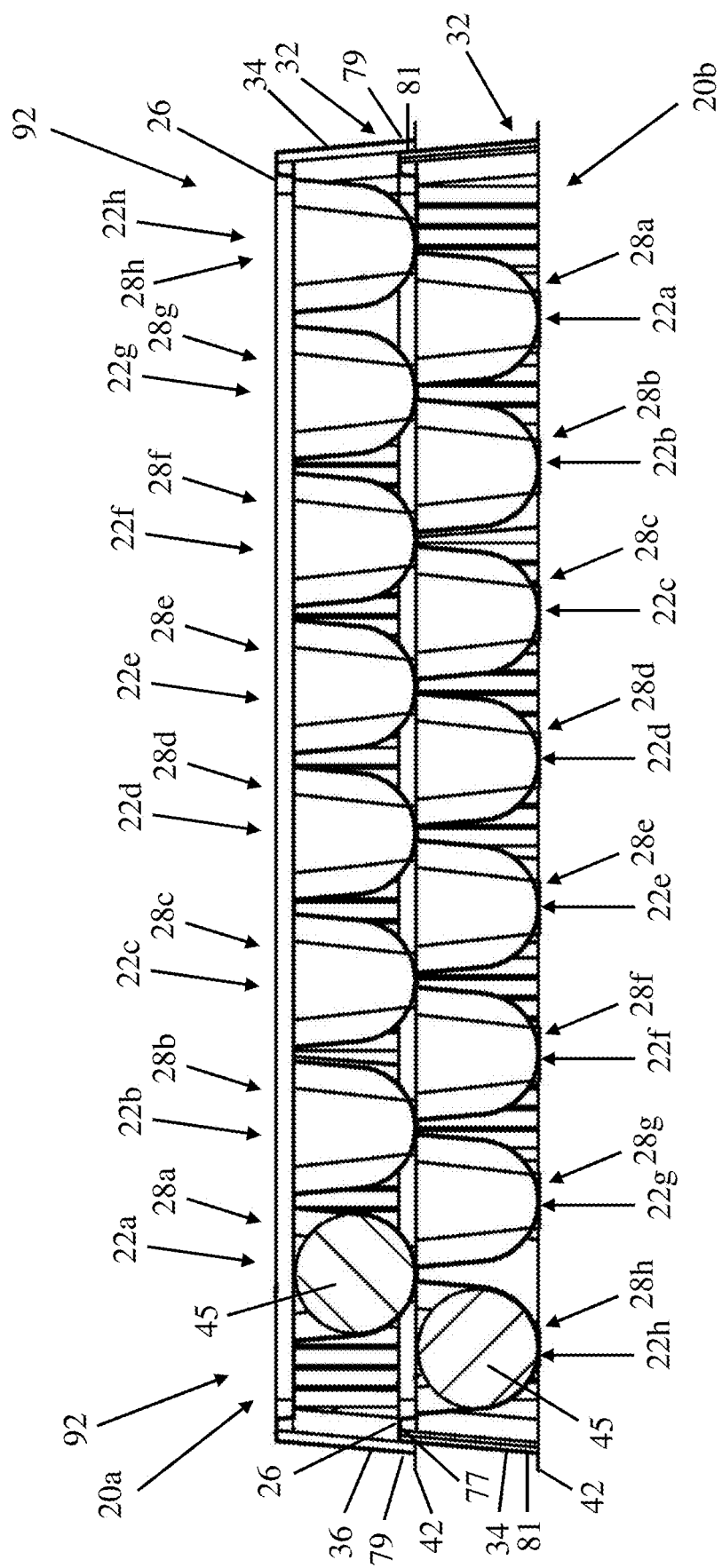
Figure 4:
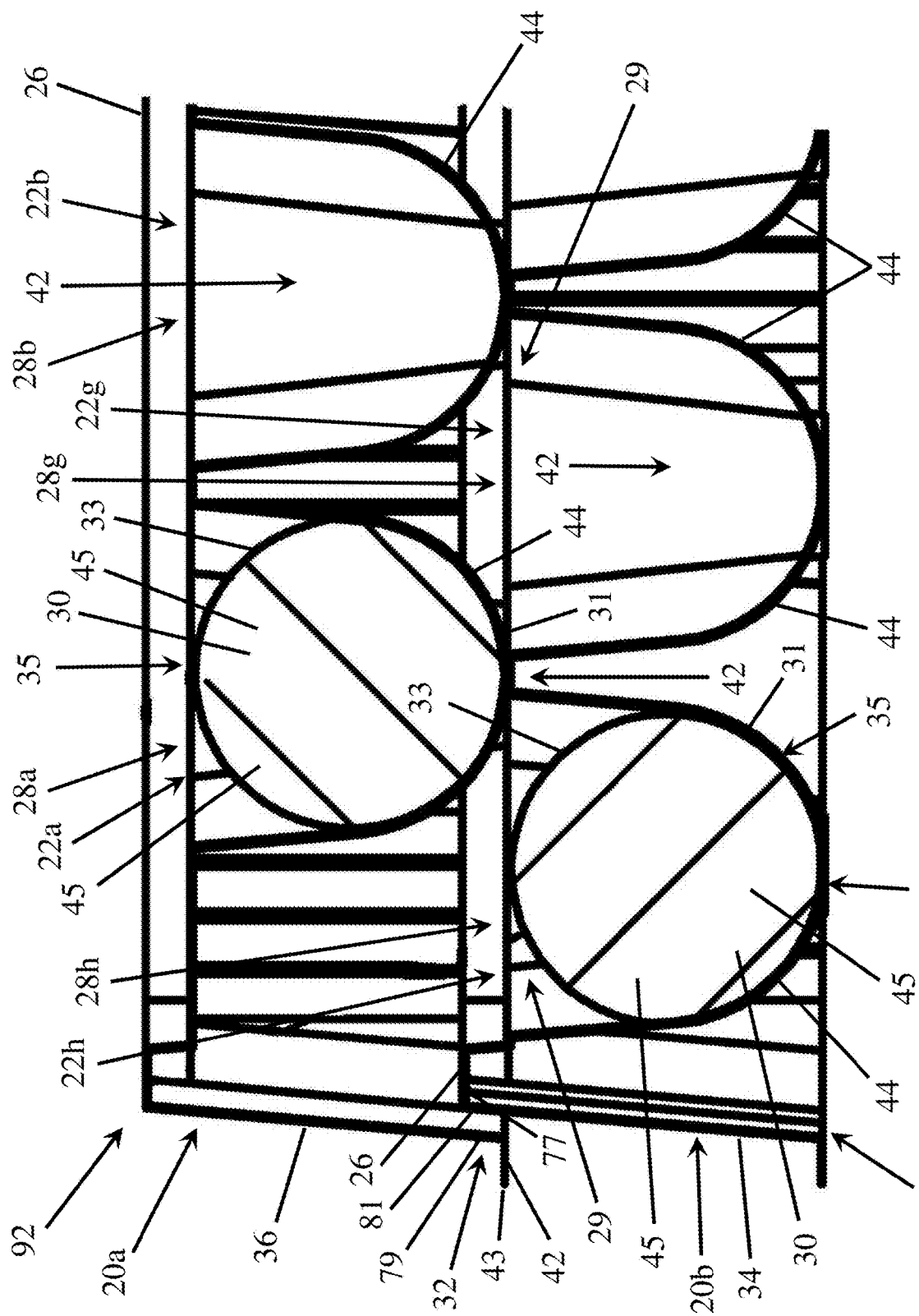

FIG. 3 is a cross-sectional view of the stacked trays of FIGS. 1 and 2 taken through cross section 3-3 of FIG. 2; and FIG. 4 is an enlarged fragmentary view of the cross-section of FIG. 3 illustrating more clearly contact between the bottom of the overlying tray with an upper tray land of the underlying tray forming a protective enclosure around the cheese log disposed in one of the compartments of the underlying tray.

Before explaining one or more embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIGS. 1-4 illustrates a first preferred embodiment of a plurality of vertically stackable substantially rigid generally rectangular article-holding trays $20a$ and $20b$ each made, preferably molded, more preferably thermoformed, of plastic having at least a plurality of pairs, i.e., at least three, of recessed article-holding shape-supporting compartments $22a$-$22h$ formed in an exterior surface $24$ of each tray $20a$ & $20b$ that can be and preferably is a generally flat top surface $26$ of each tray $20a$ & $20b$. Each compartment $22a$-$22h$ is integrally formed in the exterior surface $24$ or top surface $26$ of the tray $20a$ and $20b$ during making of the tray $20a$ and $20b$ with a desired predetermined three-dimensional contour configured to substantially conform to a desired predetermined three-dimensional shape of an article $25$ received therein. In a preferred embodiment, each compartment $22a$-$22h$ of the tray $20a$ and $20b$ has a desired predetermined three-dimensional contour that is substantially complementary with the desired predetermined three-dimensional shape of an article $25$ received therein that preferably is a malleable article $25$, such that the desired predetermined three-dimensional contour of each compartment $22a$-$22h$ not only holds and protects the article $25$ but also supports and maintains a desired predetermined three-dimensional shape of the malleable article $25$. As discussed in more detail below, where the articles $25$ loaded in compartments $22a$-$22h$ of each tray $20a$ and $20b$ are malleable articles $25$ that are in a formable or moldable state, the three-dimensional contour of the compartments $22a$-$22h$ respectively define three-dimensionally contoured article-shaping molds $28a$-$28h$ of each tray $20a$ and $20b$ that each substantially conform the shape of article $25$ thereto preferably also setting or fixing the shape of the article $25$ when no longer in a moldable or formable state, e.g., such as when dry, cured or hardened.

Each tray $20a$ and $20b$ is molded preferably by thermoforming the tray $20a$ and $20b$ of a generally planar blank preferably in the form of a sheet of food grade thermoplastic polymer resin, preferably amorphous polyethylene terephthalate or APET, thereby producing a tray $20a$ and $20b$ in accordance with the invention having compartments $22a$-$22h$ in which malleable articles $25$, preferably formable or moldable edible food articles $30$, are deposited during filling of each tray $20a$ and $20b$ during tray use and operation. While the upper tray $20a$ depicted in FIG. 1 is shown loaded with only a single article $25$ that preferably is an edible food article $30$ in compartment $22a$, each one of the rest of the compartments $22b$-$22h$ of the tray $20a$ can each be loaded with such an article $25$ that preferably also is an edible food article $30$ during filling of the tray $20a$. As such, each one of the vertically stackable trays $20a$ and $20b$ constructed in accordance with the present invention can and preferably does have at least one article $25$, preferably an edible food article $30$ in a formable or moldable state, received in each one of at least a plurality, preferably at least a plurality of pairs, i.e., at least three, of the recessed compartments $22a$-$22h$ formed in the tray $20a$ and/or $20b$ with each one of the compartments $22a$-$22h$ of the tray $20a$ and/or $20b$ defining a three dimensionally contoured article forming mold $28a$-$28h$ such that each tray $20a$ and $20b$ is an article molding tray $23a$ and $23b$ of the invention. Each one of the compartments $22a$-$22h$ of each vertically stackable tray $20a$ and $20b$ defines a three dimensionally contoured article forming mold $28a$-$28h$ that is used to impart a desired shape to each malleable article $25$, preferably formable or moldable edible food article $30$, received therein before its permanent shape-memory becomes fixed or set. As a result, such a tray $20a$ and $20b$ constructed in accordance with the present invention advantageously forms or molds each malleable article $25$, preferably formable or moldable edible food article $30$, received in one or more of its compartments $22a$-$22h$ so at least a portion of the shape of each article $25$, preferably edible food article $30$, becomes set or fixed to have a shape that substantially conforms to the three-dimensional contour of the corresponding article forming mold $28a$-$28h$ of the respective compartment $22a$-$22h$ of the tray $20a$ and/or $20b$ holding the article $25$ when the shape memory of the article 25, preferably edible food article 30, becomes substantially permanently set or fixed.

Each vertically stackable tray 20a and 20b preferably is generally rectangular, e.g., square, having a base 32 from which a first pair of spaced apart and generally parallel tray sidewalls 34, 36 and a second pair of spaced apart and generally parallel tray sidewalls 38, 40 upwardly extend to or adjacent the top surface 26 of the tray 20a, 20b. The base 32 of each tray 20a and 20b can include or even be defined by an outwardly projecting flange 42 that extends along the bottom of each tray 20a and 20b substantially completely about the entire outer periphery of each tray 20a and 20b as depicted in FIG. 1. If desired, each tray 20a and 20b can be made without any such flange 42 extending outwardly along or adjacent the bottom or base 32 or of the tray 20a and 20b such as depicted in FIGS. 1-4.

At least a portion of each one of the tray sidewalls 34, 36, 38, 40, of each vertically stackable tray 20a and 20b is formed with at least one rib section 44, 46, 48, 50 integrally formed therein during molding, preferably thermoforming, the tray 20a and 20b that strengthens each tray sidewall 34, 36, 38, 40 and helps structurally rigidify each tray 20a and 20b. Each rib section 44, 46, 48, 50 of each tray 20a and 20b is composed of at least a plurality of pairs, i.e. at least three, elongate and generally parallel vertically extending ribs 52 side-by-side one another with each adjacent pair of ribs 52 spaced apart by an elongate substantially straight and vertically extending recessed channel 54. As such, each tray wall reinforcing rib section 44, 46, 48, 50 of each tray 20a and 20b is made up of at least a plurality of pairs, i.e. at least three, of substantially straight elongate and generally parallel ribs 52 and at least a plurality of pairs, i.e. at least three, of substantially straight elongate and generally parallel channels 54 with the ribs 52 and channels 54 alternating throughout each rib section.

To further strengthen each tray 20a and 20b, each corner of the tray 20a and 20b is formed of an elongate generally vertically upwardly extending reinforcing tray corner rib 56, 58, 60, 62 that is convexly curved interconnecting adjacent pairs of sidewalls 34 and 38, 36 and 38, 36 and 40, and 34 and 40. Each tray corner rib 56, 58, 60, 62 of each tray 20a and 20b preferably has a convexly arc shaped curved transverse cross-section with each corner rib 56, 58, 60, 62 inclined at an acute included angle from at or adjacent the base 32 toward the top surface 26 to facilitate nesting of a plurality of trays 20a and 20b during filled tray stacking and empty tray stacking. Such a transversely outwardly bowed or curved rib cross-section of each corner rib 56, 58, 60, 62 of each tray 20a and 20b combined with each corner rib 56, 58, 60, 62 being inwardly inclined toward respective adjacent opposite ends 64, 66 of corresponding adjacent compartments 22a and 22h, as depicted in FIG. 1, enables an interior surface of the corner ribs of a first tray 20b to slide over and register substantially parallel against an exterior surface of the corner ribs of a second tray 20a being vertically stacked upon the first tray 20b.

With continued reference to FIG. 1, to facilitate stacking of one tray 20a on top of another tray 20b that is at least partially filled with an article 25, e.g., edible food article 30, received in at least one of the tray compartments 22a-22h, each tray 20a and 20b has a generally horizontal filled tray stacking land 65 recessed into the top surface 26 of the tray 20b upon which a portion of the bottom or base 32 of the overlying tray 20a rests preventing the tray bottom or base 32 of the overlying tray 20a from contacting article 25, e.g. edible food article 30, received in one or more of the compartments 22a-22h of the underlying tray 20b. As also shown in FIG. 1, the recessed stacking land 65 formed in each tray 20a and 20b preferably is flat or generally planar and generally rectangular bounded or delineated by a generally rectangular stepped full tray stacking interface 67 between the tray top surface 26 and the land 65. The downwardly stepped full tray stacking interface 67 is an abutment or edge that extends downwardly from the tray top surface 26 of each tray 20a and 20b to the land 65. In the preferred tray embodiments shown in FIG. 1, the downwardly stepped full tray stacking interface 67 is defined by at least one pair, e.g., a first pair, of substantially straight and generally parallel filled tray stacking guide edges 69, 71, which are upraised overlying tray guide end edges or stacked tray end abutments, disposed along opposite ends 64, 66 of at least a plurality, preferably at least a plurality of pairs, of the compartments 22a-22h of the tray 20a and 20b and which can be disposed along opposite ends of all of the compartments 22a-22h of each tray 20a and 20b. In the preferred tray embodiments shown in FIG. 1, the filled tray stacking guide edges 69, 71 are substantially continuous and elongate and extend along all of the compartments 22a-22h of the tray 20a, 20b. In the preferred tray embodiments shown in FIG. 1, the stepped stacking interface 67 can and preferably further does include such a second pair of generally parallel stacking guide edges 73, 75 disposed generally orthogonally to the first pair of stacking guide edges 69, 71. Such a downwardly stepped interface 67 extends downwardly from the tray top surface 26 to the land 65 of each tray 20a and 20b and preferably is further defined by the second pair of substantially straight and generally parallel filled tray stacking guide edges, which preferably are upraised overlying tray guide side edges or stacked tray side abutments, disposed outboard of and generally parallel to underlying tray compartments 22a-22h of the tray 20a and 20b as depicted in the tray 20a in FIG. 1.

As is best shown in FIG. 3, each tray 20a, 20b has an inboard filled tray stacking land 77 that rests on or abuts against the top surface 26 of the tray 20a, 20b below it thereby forming a filled stacked tray assembly 92. To help locate and seat the upper tray 20a on the lower tray 20b during filled tray stacking, a bottom portion of each tray sidewall 38, 40, 44, 46 of the upper tray 20a defines a filled tray stacking locator and sealing skirt 79 that slidable overlaps a corresponding filled stacking upper seating portion 81 of the tray sidewall 44, 46, 38, 40 of the lower tray 20b as shown in FIG. 3.

To further facilitate vertical stacking of one tray 20a on top of another tray 20b, one pair of generally parallel tray sidewalls 34 and 36 of each tray 20a and 20b has a pair of spaced apart generally rectangular and elongate tray nesting guide slots 68, 70 spaced apart along each one of tray sidewalls 34 and 36 by corresponding intermediate elongate and generally rectangular rib sections 44a, 46a of respective tray sidewalls 34 and 36. The other pair of generally parallel tray sidewalls 38 and 40 of each tray 20a and 20b has a plurality of pairs of, i.e. at least three, concavely curved arcuate nesting guide slots 72, 74, 76 recessed therein spaced apart along each one of tray sidewalls 38 and 40.

When one tray 20a, which can be empty, partially filled, having at least one article 25 received in at least one of its tray compartments 22a-22h of the one tray 20a, e.g., a plurality of articles 25 received in a corresponding plurality of its compartments 22a-22h of the one tray 20a, or completely filled, e.g., an article 25 received in each one of the compartments 22a-22h of the one tray 20a, is vertically stacked on top of another tray 20b, e.g., underlying tray 20b, which is at least partially filled, having at least one article 25 received in at least one of the tray compartments 22a-22h of the other underlying tray 20b, e.g., a plurality of articles 25 received in a corresponding plurality of compartments 22a-22h of the other underlying tray 20b, or completely filled, e.g., an article 25 received in each one of the compartments 22a-22h of tray 20b, one of the trays 20a is angularly oriented, e.g. rotated, 180° relative to the other underlying one of the trays 20b before the one tray 20a is stacked on top of the other underlying tray 20b producing the stacked tray arrangement 27 depicted in FIG. 1 with at least a plurality of the trays 20a and 20b are stacked one on top of another forming a filled stacked tray assembly 92. An at least partially filled stacked tray assembly 27, e.g., filled stacked tray assembly 27, like that depicted in FIG. 1 can have at least a plurality of pairs, i.e., at least three, of the trays 20a, 20b, 20c (not shown), with one tray, e.g., tray 20b, oriented 180° relative to the tray, e.g., tray 20c (not shown), underneath it, e.g., onto which it is stacked, as well as oriented 180° relative to the tray, e.g., tray 20a, above it, e.g., stacked onto it, with each overlying tray 20a and 20b protecting respective underlying tray 20b and 20c (not shown) onto which the tray 20a and 20b is respectively stacked. Tray 20c is not shown in the drawing figures but would be a tray substantially identical to trays 20a and 20b that is rotated or oriented 180° relative to the tray above it that is stacked thereon.

When oriented 180° relative to one another and stacked as shown in FIG. 1, a portion of the bottom or base 32 of the overlying tray 20a preferably seats in the tray stacking land 56 of the underlying tray 20b providing clearance between the stacked trays 20a and 20b that prevents any contact by the overlying tray 20a with any article 25 received in any of the compartments 22a-22h of the underlying tray 20b. During partially or completely filled-tray vertical stacking when the substantially identically formed trays 20a and 20b are rotated or oriented 180° relative to one another and stacked, sidewall 34 of one tray 20a overlies sidewall 36 of the other stacked tray 20b, sidewall 36 of the one tray 20a overlies sidewall 34 of the other stacked tray 20b, sidewall 38 of the one tray 20a overlies sidewall 40 of the other stacked tray 20b, and sidewall 40 of the one tray 20a overlies sidewall 38 of the other stacked tray 20b as further depicted in FIG. 1.

When it is desired to stack a plurality of empty trays 20a and 20b in which all of the compartments 22a-22h of all of the trays 20a and 20b to be stacked are empty, each pair of empty trays 20a and 20b to be vertically stacked are oriented the same way, i.e., oriented 0° relative to one another, and stacked on top of one another. When the empty trays 20a and 20b are stacked, the intermediate ribbed regions 44a and 46a of the sidewalls 34 and 36 of one empty tray 20a slidably receives the corresponding ribbed regions 44a and 46a of the sidewalls 34 and 36 of the other empty tray 20b enabling the empty tray vertical stack height to be less than half of the filled tray vertical stack height of a partially filled stack or a completely filled tray stack, e.g., stacked tray assembly 27. During empty tray stacking, the outer surface of empty tray nesting guide slots 68 and 70 formed in sidewalls 34 and 36 of one of the empty trays 20 slidably nest and register with the internal surface of empty tray nesting guide slots 68 and 70 formed in sidewalls 34 and 36 of the other one of the empty trays 20 being stacked. Likewise, during empty tray stacking, the arcuate empty tray nesting guide channels 72, 74, 76 of the sidewalls 38 and 40 of one of the empty trays 20 respectively nest with or in corresponding arcuate empty tray nesting guide channels 72, 74, 76 of corresponding sidewalls 38 and 40 of the other one of the empty trays 20 being stacked thereon or therewith.

When empty trays 20a and 20b are stacked in this manner, the plurality of empty stacked trays 20a and 20b have a compact stacked height of less than the height of the same plurality of trays 20a and 20b when filled and stacked in the manner shown in FIG. 1. In a preferred embodiment, the empty tray stack height of a plurality of empty trays 20a and 20b oriented 0° relative to one another and stacked is no greater than 70% of the filled tray stack height of the same plurality of trays 20a and 20b when oriented 180° and stacked. In another preferred embodiment, the empty tray stack height of a plurality of empty trays 20a and 20b oriented 0° relative to one another and stacked is no greater than 50% of the filled tray stack height of the same plurality of trays 20a and 20b when oriented 180° and stacked. In a further preferred embodiment, the empty tray stack height of a plurality of empty trays 20a and 20b oriented 0° relative to one another and stacked is no greater than 35% of the filled tray stack height of the same plurality of trays 20a and 20b when oriented 180° and stacked. In still another preferred embodiment, the empty tray stack height of a plurality of empty trays 20a and 20b oriented 0° relative to one another and stacked is no greater than 25% of the filled tray stack height of the same plurality of trays 20a and 20b when oriented 180° and stacked.

Such a compact unfilled tray stack height advantageously enables a greater number of trays 20a and 20b to be stacked at 0° orientation relative to one another and shipped back for reuse. In a preferred embodiment, at least a plurality of pairs, i.e., at least three of the empty trays constructed in accordance with trays 20a and 20b shown in FIG. 1 can be stacked at 0° orientation and occupy a lesser stacked height than the plurality of trays 20a and 20b shown in FIG. 1 in the filled stacked position or orientation where the trays 20a and 20b are oriented 180° relative to one another. In another preferred embodiment, at least four such trays, e.g., trays 20a and 20b, can be empty stacked in the same height as the pair of filled stacked trays 20a and 20b shown in FIG. 1. In yet another preferred embodiment, at least five such trays, e.g., trays 20a and 20b, can be empty stacked in the same height as the pair of filled stacked trays 20a and 20b shown in FIG. 1. Such compact empty tray stacking advantageously maximizes the number of empty trays that can be stacked together and shipped to a food processor, e.g., cheese maker, after tray manufacture as well as during return to the food processor after use in shipping product to a customer or end user.

With respect to use and operation of tray 20a and/or tray 20b, in a preferred tray method and embodiment, articles 25 that preferably are freshly produced edible food articles 30 are automatically loaded into compartments 22a-22h of trays 20a, 20b filled in real time during production of the edible food articles 30. Trays 20a, 20b that are filled are vertically stacked on top of one another and put on a pallet (not shown), such as for storage, shipping, further processing of the edible food articles 30 in the compartments 22a-22h of the filled and stacked trays 20a, 20b or the like providing time for a shape-memory of each article 30 to set or become fixed. With further respect to that discussed below, where freshly produced edible food articles 30 are loaded into compartments 22a-22h of trays 20a, 20b during a loading step or operation while still in a malleable state, palletizing filled trays 20a, 20b stacked upon one another for storage, shipping, further edible food article processing or the like provides time for the shape-memory of each article 30 to become set or fixed thereby substantially conforming at least a portion of a three-dimensional shape of each article 30 to that of a three dimensional contour of the corresponding tray compartment 22a-22h holding the article 30.

As previously indicated, such a tray 20a, 20b that is molded, preferably thermoformed, of such a food grade plastic material like APET advantageously produces a tray 20a, 20b that is of one-piece, unitary and substantially homogeneous construction having an optimal thickness that minimizes the cost of the tray 20a, 20b while imparting strength, structural rigidity, toughness, resilience, and durability enabling economical repeated reuse of each tray 20a, 20b at least a plurality of pairs, i.e. at least three, of times. Such a tray 20a, 20b made of food grade plastic like APET that is Food and Drug Administration approved or compliant produces a tray 20a, 20b that advantageously is sterilizable, reusable and which can be used to hold articles 25 that are unpackaged edible food product articles 30, preferably unpackaged cheese articles 35, more preferably unpackaged mozzarella cheese logs 45, such that each unpackaged edible food product article 30, preferably each unpackaged cheese article 35, and more preferably each unpackaged mozzarella cheese log 45, comes into direct contact with part of the tray 20a, 20b when loaded into a corresponding one of the compartments 22a-22h of the tray 20a, 20b during tray filling and article holding use and operation of the tray 20a, 20b.

Such a tray 20a, 20b made of food grade plastic material advantageously enables unpackaged edible food product articles 30, preferably unpackaged cheese articles 35 and more preferably unpackaged mozzarella cheese logs 45, to be loaded into one or more respective compartments 22a-22h of tray(s) 20a, 20b in direct contact therewith whereby each such filled tray 20a, 20b can then be vertically stacked, palletized, and either stored or transported preferably without requiring nor preferably having any liner, wrapping or packaging between the tray 20a, 20b and articles 25, e.g., food product articles 30, preferably cheese articles 35, more preferably mozzarella cheese logs 45, held in the compartments 22a-22h of the tray 20a, 20b. Further with respect to that discussed below, such a tray 20a, 20b made of such food grade plastic material is advantageously well suited for use and preferably is used to gather or collect in its compartments 22a-22h malleable articles 25 as they are being freshly made or produced, such as freshly made or produced food articles 30, preferably freshly made or produced cheese articles 35, more preferably freshly made or produced mozzarella cheese logs 45, while still in a formable or moldable state.

In one preferred method and embodiment in accordance with the present invention, freshly produced mozzarella logs 45 are automatically loaded into compartments 22a-22h of one tray 20a after another tray 20b as the freshly produced mozzarella logs 45 are extruded from a food processing machine (not shown) that preferably is a single screw or twin-screw extruder (not shown) while still in a moldable or formable state. In one such preferred method and embodiment in accordance with the invention, mozzarella logs 45 are gravity fed through a magazine (not shown) that preferably is a gravity fed magazine (not shown) as the logs 45 are produced, such as by being extruded from a food processing machine that preferably is an extruder (not shown). Where such a gravity fed magazine (not shown) is employed, the mozzarella cheese logs 45 are gravity fed through or via the magazine into respective compartments 22a-22h of one tray 20a indexing the tray 20a and/or magazine until all of its compartments 22a-22h are filled before removing the filled tray 20a and replacing it with an empty tray 20b also to be filled with logs 45 in real time as they are freshly produced. As a result of being freshly produced, cheese logs 45 loaded into compartments 22a-22h of tray 20a and 20b are in a moldable or formable viscous form having a temperature greater than room temperature, preferably greater than 85° Fahrenheit, and more preferably greater than 90° Fahrenheit.

As such, tray 20a, 20b is molded, preferably thermoformed, of such a food grade plastic, preferably APET, producing a tray 20a, 20b in accordance with the invention that is suitably thick, rigid, shape-retaining, durable, tough and resilient as well as sterilizable so as to be reusable at least a plurality of pairs, i.e., at least three times, in holding articles 25 that are food product items 30, more preferably cheese logs 45, in direct contact therewith, including as the freshly made food product items 30, preferably cheese logs 45, are loaded into compartments 22a-22h of each tray 20a, 20b.

A preferred embodiment of a tray 20a, 20b constructed in accordance with the present invention is a cheese article holding tray having at least five, preferably at least six, and more preferably at least eight, recessed cheese article-holding compartments 22a-22h, with each one of the compartments 22a-22h having an elongate post-extrusion cheese article thermal forming mold 28a-28h with a cheese article shape-memory setting sidewall formed having a transverse cross-section or transverse sidewall contour substantially complementary with at least a portion 31 of an exterior surface 33 of the cheese article 35 that comes into contact with the mold sidewall when the cheese article 35 is disposed in the mold 28a-28h of one of the compartments 22a-22h of tray 20a, 20b.

Such a tray 20a, 20b constructed in accordance with the present invention is substantially rigid and generally rectangular, e.g., square, is configured with three-dimensionally formed or molded features that enable at least a plurality of pairs, i.e. at least three, of the trays 20a, 20b to be vertically stacked one on top of the other when the compartments 22a-22h of one or more of the stacked trays 20a, 20b are filled with articles 25 as well as when all of the compartments 22a-22h of each one of the stacked trays 20a, 20b are empty. In a preferred tray embodiment, each tray 20a, 20b is formed or molded with one or more three-dimensional features integrally formed in each tray 20a, 20b that enable stacking of at least a plurality of pairs, i.e. at least three, of the trays 20a, 20b when empty in an empty tray stack having a vertical tray stack height that is less than the vertical tray stack height of a filled tray stack when one or more compartments 22a-22h of completely or partially filled trays 20a, 20b are vertically stacked.

With specific reference to the plurality of partially filled stacked trays 20a, 20b shown in FIG. 1, each one of the stacked trays 20a, 20b is integrally molded or formed during making of the tray 20a, 20b with one or more stacking features that enable vertical stacking of completely or partially filled trays 20a, 20b that have one or more compartments 22a-22h holding an article 25 in a manner providing there is an article-protecting clearance space 29 (FIG. 4) between each pair of vertically stacked trays 20. When vertically stacked, each adjacent pair of vertically stacked trays 20, like the adjacent stacked tray pair shown in FIGS. 3 and 4, not only are configured to provide an article-protective clearance space 29 therebetween, but the adjacent pair of stacked trays 20a, 20b preferably also define a protective enclosure in which articles 25 in compartments 22a-22h of the underlying tray 20 are housed.

As discussed in more detail below, a preferred tray 20a, 20b of the present invention has multiple compartments 22a-22h each formed with a desired three-dimensional contour substantially complementary to a desired final predetermined three-dimensional shape of a malleable article 25 received in the compartments 22a-22h while the article 25 is still in a formable or moldable state such that each of the compartments 22a-22h also defines corresponding three-dimensionally contoured article-shaping molds 28a-28h that each shape or form at least a portion 31 (FIG. 4) of an outer surface 33 of an article 25 received therein that is in contact therewith while the article 25 is in a formable or moldable state. In a preferred embodiment, the tray 20a, 20b has multiple compartments 22a-22h that are each article shaping or forming molds 28a-28h each having a desired predetermined three-dimensional contour that molds an article 25 received therein by shaping or forming at least a contacting portion 31 of the outer surface 33 of the article 25 received therein while the article 25 formable or moldable substantially conforming the three-dimensional shape of the contacting portion 31 therewith. As a result, articles 25 delivered or otherwise placed in compartments 22a-22h during filling of tray 20a, 20b, while in such a formable or moldable state, substantially conforms to the shape of the predetermined three-dimensionally contoured mold 28a-28h defined by the respective compartments 22a-22h. When the articles 25 transition from such a formable or moldable state to a substantially solidified or hardened state, it fixes a shape memory of each substantially solid or hardened article 25 so that the three-dimensional shape of formed portion 31 of outer surface 33 due to contact with the three-dimensionally contoured mold 28a-28h defined by the compartment 22a-22h holding the article 25 remains substantially conformed therewith.

In a preferred embodiment, the desired predetermined three-dimensional shape or contour of each compartment 22a-22h helps to at least support a desired predetermined shape the malleable article 25 has prior to and preferably also during loading into compartment 22a-22h including when the tray 20a, 20b is moved, such as into storage, to remove and/or package or wrap articles 25 in the compartments 22a-22h, during transport on a pallet (not shown) onto which a plurality of trays 20a, 20b is stacked, as well as during shipment of a plurality of pairs of trays, i.e., at least three, stacked trays 20a, 20b (only two of which are shown in FIGS. 1-4) carried by a pallet (not shown).

In one such preferred embodiment, the desired predetermined three-dimensional shape or contour of each compartment 22a-22h of tray 20a, 20b not only helps three-dimensionally form or three-dimensionally contour each one of the malleable articles 25 into a desired predetermined three-dimensional shape during loading, e.g., extrusion, into a corresponding one of the tray compartments 22a-22h, but also helps support and maintain the desired three-dimensional shape after loading. The three dimensional contour or shape of each of the compartments 22a-22h help set or fix at least a portion of a desired shape of the malleable articles 25 during and preferably after loading them into corresponding compartments 22a-22h of tray 20a, 20b including when the trays 20a, 20b are moved, such as when vertically stacked and moved into storage, such as when it is desired to remove articles 25 after the compartments 22a-22h have set or helped set at least part of the substantially permanent three dimensional shape or contour of the respective articles 25 and wrap and/or package them, as well as during shipment of a plurality of pairs of trays 20a, 20b (only two of which are depicted in FIGS. 1-4) whose compartments 22a-22h are filed with articles 25.

In another such preferred embodiment, the desired predetermined three-dimensional shape or contour of each compartment 22a-22h of tray 20a, 20b helps form or mold at least a part of malleable articles 25 loaded, e.g., extruded, into respective compartments 22a-22h such as when the articles 25 are in a viscous, flowable or otherwise highly malleable state upon loading, e.g., extrusion. Three-dimensionally shaped or contoured compartments 22a-22h of tray 20 not only helps form or mold at least a portion of such highly malleable articles 25 loaded therein but advantageously also helps set at least a portion of the shape or contour of each loaded article 25 by retaining the desired shape or contour of the loaded article 25 long enough for a substantially permanent or fixed shape memory of the article 25 to be set. Such fixing or setting of the shape memory of such highly malleable articles 25 can and preferably does occur right from loading of the articles 25 into compartments 22a-22h of tray 20a, 20b and thereafter including when the trays 20a, 20b are stacked and moved. As such, the three dimensional contour or shape of the compartments 22a-22h of each tray 20a, 20b helps set or fix the three dimensional shape of the article 25 including when the filled trays 20a, 20b are vertically stacked and moved into storage, including when it is desired to remove articles 25 after the compartments 22a-22h have set or helped set at least part of the substantially permanent three dimensional shape or contour of the respective articles 25 and/or wrap and/or package them, as well as during shipment of a plurality of trays 20a, 20b, preferably a plurality of pairs of trays, whose compartments 22a-22h are filed with articles 25. Such forming or molding of at least a portion of the shape of such highly malleable articles 25 occurs by the articles 25 being retained long enough in their respective compartments 22a-22h of the tray 20a, 20b for the highly malleable articles 25 to sufficiently dry, cure or otherwise harden, thereby substantially permanently setting the shape memory of each article 25 while in its tray compartment.

Each compartment 22a-22h therefore not only supports but helps set a desired predetermined shape malleable articles 25 each have prior to and preferably also during loading into compartments 22a-22h of one or more trays 20a, 20b. The three dimensional contour or shape of the compartments 22a-22h help set at least a portion of a desired shape of the malleable articles 25 during and preferably after loading them into corresponding compartments 22a-22h of one or more trays 20a, 20b including when the trays 20a, 20b are moved, such as when vertically stacked and moved into storage, such as when it is desired to remove articles 25 after the compartments 22a-22h have set or helped set at least part of the substantially permanent three dimensional shape or contour of the respective articles 25 and wrap and/or package them, as well as during shipment of a plurality of pairs of trays 20 whose compartments 22a-22h are filed with articles 25.

Each such compartment is therefore configured for supporting and protectively holding an elongate article 25 that preferably is an elongate soft or delicate food product item 26 that preferably is an elongate and generally cylindrical cheese log 45. Tray 20a, 20b has a first pair of generally parallel sidewalls 34, 36 that are generally parallel to a second pair of sidewalls 38, 40 that extend generally upwardly from a base 32 of the tray 20 disposed at or along the bottom of the tray 20. that includes, is formed by, or is formed of a bottom flange 42 that extends outwardly from the sidewalls 34, 36, 38, and 40 generally along a common plane, e.g., base plane 43 (FIG. 4), about substantially the entire periphery of the tray 20a, 20b.

As is also shown in FIGS. 1-4, at least a plurality, preferably at least a plurality of pairs, i.e., at least three, of trays 20a, 20b (only two trays of which are shown in FIGS. 1-4) are stackable on top of one another with the article-holding compartments 22a-22h of the bottom-most tray 20b each holding an article 25, preferably food product item 26, more preferably cheese log 45, with another tray, e.g., tray 20a, stacked on top thereof preferably also having each compartment 22a-22h holding an article 25, preferably food product item 26, more preferably cheese log 45, and at least one more tray 20 (not shown) oriented 180 stacked thereon such that the articles 25, preferably food product items 30, more preferably cheese logs 45, are held in their respective compartments 22a-22h of the underlying tray 20 and covered, preferably protected, by the overlying tray 20 removably stacked above. As best shown in FIG. 1, each tray 20 is configured to stably and securely stack on top of another tray 20 with the top tray 20 oriented 180°, e.g., rotated 180°, relative to the bottom tray 20 before stacking on the bottom tray 20.

The tray 20a, 20b preferably is thermoformed of a generally planar blank or sheet of food grade plastic material, preferably amorphous polyethylene terephthalate or APET, to produce such a tray 20a, 20b in accordance with the present invention against which an article 25 that is an unpackaged human edible food product item 30, preferably elongate generally cylindrical cheese log 45, can come into direct contact therewith while in unwrapped and unpackaged form. As such, tray 20a, 20b is molded, preferably thermoformed, of such a food grade plastic, preferably APET, producing a tray 20a, 20b in accordance with the invention that is suitably thick, rigid, shape-retaining, durable, tough and resilient as well as sterilizable so as to be reusable at least a plurality of pairs, i.e., at least three times, in holding articles 25 that are food product items 30, more preferably cheese logs 45, in direct contact therewith including as the freshly made food product items 30, preferably cheese logs 45, are loaded into compartments 22a-22h of each tray 20.

With more specific reference to FIGS. 2-4, a preferred embodiment of a tray 20a, 20b, constructed in accordance with the present invention is a cheese article holding tray having at least five, preferably at least six, and more preferably at least eight, recessed cheese article-holding compartments 22a-22h, with each one of the compartments 22a-22h having an elongate post-extrusion cheese article thermal forming cradle 42 with a cheese article shape-memory setting cradle sidewall 44 formed having a cradle cross-section or transverse cradle sidewall contour substantially complementary with at least a portion of an exterior surface of the cheese article 35 that comes into contact with the cradle sidewall 44 when the cheese article 35 is loaded in the cradle of one of the compartments 22a-22h of tray 20.

A preferred embodiment of the tray 20a, 20b that preferably is generally rectangular, which can be square, preferably has a length and a width producing a generally rectangular, e.g., square, form or form factor that occupies a surface area greater than two thirds of the surface area of a standard forty-inch by forty-eight inch (40"×48") pallet, such as an ISO pallet or North American pallet, which is of generally rectangular construction. In one preferred tray embodiment, the tray 20a, 20b has length and width dimensions producing a tray 20 that fits substantially completely on such a standard forty-inch by forty-eight inch (40"×48") pallet occupying at least 80%, preferably at least 90% of the surface area on the pallet but preferably occupying such a surface area no greater than that of the pallet. In one such preferred tray embodiment, tray 20a, 20b has a length and width substantially the same as the length and width of a standard ISO or North American pallet having a standard forty-inch by forty-eight inch (40"×48") pallet size.

Such a tray 20a, 20b of the present invention is stackable forming a filled stacked assembly of at least a plurality of trays 20a, 20b, preferably at least a plurality of pairs, i.e., at least three, of the trays 20a, 20b, that is stacked when filled with the trays 20a and 20b oriented 180° relative to one another, and which can be oriented 0° relative to one another and stacked when empty into an compact height empty stacked assembly having a stacked height less than the filled stacked assembly.

The present invention is therefore advantageously directed to a tray 20a, 20b that eliminates the need for wrapping or packaging edible food articles that are in a malleable form, such as when made or otherwise produced, with the tray formed with at least a plurality of pairs of article holding compartments each three dimensionally contoured so as to define an edible food article mold that shapes or forms an edible food article received therein that is in a formable or moldable state so as to substantially conform at least a portion of the edible food article to the shape of the three-dimensional contour of the mold of the compartment in which the article is received. A preferred embodiment of the tray has at least a plurality of pairs of elongate article holding compartments that are generally parallel with one another with the article shaping or forming mold defined by each compartment formed of a compartment sidewall that has a concavely curved cross-section that preferably is generally semicircular in a transverse cross-section. In a preferred embodiment, each compartment has a mouth through which an edible food article enters during the filling of the tray with the mouth preferably defined by opposed portions of the generally semicircular compartment sidewall that are generally parallel to one another and which preferably can be obtuse the angled relative to one another to define a guide chute that guides the article into a desired position and/or orientation in the mold of the compartment that optimizes forming or shaping of the article before it cools, dries, cures or otherwise hardens thereby setting or fixing its shape memory so as to substantially conform at least a part of the shape of the article disposed in contact with the sidewall with the mold of the compartment in which the article is received.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. A stackable transportable tray system in combination with a plurality of pairs of moldable or formable edible or food articles comprising:

at least two trays, each tray comprising an upper surface in which a plurality of pairs of recessed article-holding compartments are formed therein that each receive and retain one of a plurality of pairs of moldable or formable edible or food articles, each one of the recessed article-holding compartments is configured as a three-dimensionally contoured article-shaping mold;

wherein each one of the moldable or formable edible or food articles is received in a corresponding one of the article-shaping molds at a temperature greater than room temperature and wherein a three-dimensional shape of each one of the moldable or formable edible or food articles is formed by the corresponding one of three-dimensionally contoured article-shaping molds in which the moldable or formable edible or food article is received;

wherein one of the trays is oriented 180° relative to another one of the trays and stacked forming a filled stacked tray assembly in which each one of the moldable or formable edible or food articles received in a corresponding one of the three-dimensionally contoured article-shaping molds of the one of the trays is retained therein and housed by another one of the trays stacked thereon providing a clearance space between the moldable or formable edible or food articles received in the three-dimensionally contoured article-shaping molds of the one of the trays and the another one of the trays stacked thereon; and wherein the plurality of pairs of moldable or formable edible or food articles composed of cheese.

2. The stackable tray system and moldable or formable edible or food article combination of claim 1, wherein each one of the trays is thermoformed from a food grade plastic, and wherein each one of the moldable or formable edible or food articles is an unpackaged edible article received in a corresponding one of the three-dimensionally contoured article-shaping molds formed in the one of the trays in a moldable or formable state and at a temperature above room temperature conforming the shape thereof to the shape of the corresponding three-dimensionally contoured article-shaping mold in which the unpackaged edible article is received.

3. The stackable tray system and moldable or formable edible or food article combination of claim 1, wherein each one of the trays comprises is configured as a storage tray with each one of the configured to hold a corresponding moldable or formable edible or food article therein when alternating trays are oriented 180° relative to one another when stacked on top of one another during storage.

4. The stackable tray system and moldable or formable edible or food article combination of claim 3, wherein each one of the trays comprises is configured as a shipping tray with each one of the configured to hold a corresponding moldable or formable edible or food article therein when alternating trays are oriented 180° relative to one another when stacked on top of one another during shipment.

5. The stackable tray system and moldable or formable edible or food article combination of claim 1, wherein a plurality of the trays are oriented 0° relative to one another and stacked forming an empty stacked tray assembly in which no moldable or formable edible or food article is received in any one of the article-holding compartments of one of the plurality of the trays on which another one of the plurality of the trays is stacked.

6. The stackable tray system and moldable or formable edible or food article combination of claim 5, wherein the empty stacked tray assembly having a set number of trays has a height less than the filled stacked tray assembly having the same set number of trays.

7. The stackable tray system and moldable or formable edible or food article combination of claim 1, wherein each one of the plurality of pairs of recessed article-holding compartments formed in each one of the trays are elongate and generally parallel to each other such that the elongate generally parallel recessed article-holding compartments are configured as elongate generally parallel three-dimensionally contoured moldable or formable edible or food article-shaping molds, and wherein the moldable or formable edible or food articles are elongate and arranged generally parallel to one another when received in the elongate generally parallel three-dimensionally contoured moldable or formable edible or food article-shaping molds of each one of the trays.

8. The stackable tray system and moldable or formable edible or food article combination of claim 7, wherein each one of the plurality of pairs of recessed article-holding compartments formed in each one of the trays is elongate, has an arcuate cross-section, and is configured for forming or molding a corresponding one of the elongate moldable or formable edible or food articles received therein into an elongate generally cylindrical edible or food article.

9. The stackable tray system and moldable or formable edible or food article combination of claim 7, wherein each one of the plurality of pairs of moldable or formable edible or food articles is made of cheese, and wherein each one of the plurality of pairs of recessed article-holding compartments of each tray are recessed cheese-holding compartments that receive one of the moldable or formable edible or food articles made of cheese.

10. The stackable tray system and moldable or formable edible or food article combination of claim 9, wherein the plurality of pairs of moldable or formable edible or food articles comprised of cheese are each a moldable or formable mozzarella cheese article, and wherein the plurality of pairs of recessed cheese-holding compartments each have a desired predetermined three-dimensional contour substantially complementary to at least a portion of a desired predetermined three-dimensional shape of a moldable or formable mozzarella cheese article received therein configured to mold or form at least a portion of the three-dimensional shape of the moldable or formable mozzarella cheese article to substantially conform to the desired predetermined three-dimensional contour of the recessed cheese-holding compartment in contact with the moldable or formable mozzarella cheese article.

11. The stackable tray system and moldable or formable edible or food article combination of claim 10, wherein each one of the trays is thermoformed of amorphous polyethylene terephthalate.

12. The stackable tray system and moldable or formable edible or food article combination of claim 7, wherein each one of the plurality of pairs of elongate generally parallel recessed article-holding compartments is configured as an elongate generally parallel three-dimensionally contoured moldable or formable edible or food article-shaping mold, and wherein each one of the moldable or formable edible or food articles is composed of mozzarella cheese extruded in a formable or moldable state into a corresponding one of the elongate generally parallel three-dimensionally contoured moldable or formable edible or food article-shaping molds at a temperature greater than room temperature forming or molding the moldable or formable edible or food article composed of mozzarella cheese into an elongate generally cylindrical mozzarella cheese log.

13. The stackable tray system and moldable or formable edible or food article combination of claim 9, wherein the plurality of cheese holding compartments each have a substantially arcuate cheese article molding surface on which the cheese article is supported substantially conforming at least a portion of the three-dimensional shape of the cheese article received therein.

14. The stackable tray system and moldable or formable edible or food article combination of claim 13, wherein the plurality of cheese holding compartments each are elongate and have a hemispherical cross-section thereby receiving and supporting a cheese article that is a generally cylindrical cheese log.

15. The stackable tray system and moldable or formable edible or food article combination of claim 9, wherein each one of the plurality of cheese holding compartments having an elongate three-dimensional shape and defining a forming mold configured for setting of a three-dimensional shape of an extruded cheese article received therein; wherein the moldable or formable edible or food articles made of cheese are each composed of mozzarella cheese extruded into a corresponding one of the cheese holding compartments in a formable or moldable state at a temperature of at least 90 degrees Fahrenheit; and wherein at least a portion of the shape of each one of the moldable or formable edible or food articles composed of mozzarella cheese substantially conforms to the three dimensional shape of the cheese holding compartment into which the moldable or formable edible or food articles composed of mozzarella cheese is extruded with the at least the portion of the shape of each one of the moldable or formable edible or food articles composed of mozzarella cheese that substantially conforms to the three dimensional shape of the cheese holding compartment into which the moldable or formable edible or food articles composed of mozzarella cheese is extruded is set during cooling thereof.

16. The stackable tray system and moldable or formable edible or food article combination of claim 1, further comprising:
   a first sidewall;
   a second sidewall extending parallel with the first sidewall;
   wherein the plurality of pairs of recessed article-holding compartments extend perpendicular relative to the first sidewall and the second sidewall; and
   wherein each of the plurality of pairs of recessed article-holding compartments extend parallel to the other recessed article-holding compartments from the first sidewall to the second sidewall.

17. A stackable transportable tray system in combination with a plurality of pairs of moldable or formable edible or food articles comprising:
   a plurality of pairs of moldable or formable edible or food articles composed of mozzarella cheese; and
   at least two stackable trays, each of the trays comprising:
      an upper surface in which a plurality of pairs of recessed three dimensionally shaped article forming and holding compartments are formed therein that each is configured to receive and retain one of the moldable or formable edible or food articles composed of mozzarella cheese therein, each one of the three dimensionally shaped article forming and holding compartments configured to form or mold at least part of a shape of the one of the moldable or edible food articles composed of mozzarella cheese received therein substantially conforming at least part of the shape the one of the moldable or edible food articles composed of mozzarella cheese to the shape thereof; and
      a first ribbed sidewall extending along a first side of the upper surface;
      a second ribbed sidewall extending along a second side of the upper surface substantially parallel to the first sidewall; and
      wherein the plurality of pairs of three dimensionally shaped recessed article forming and holding article holding compartments each extend from the first sidewall to the second sidewall; and
   wherein each one of the moldable or formable edible or food articles composed of mozzarella cheese is extruded, while in a moldable or formable state at a temperature of at least 90 degrees Fahrenheit, into a corresponding one of the three dimensionally shaped article forming and holding compartments of at least one of the trays thereby forming or molding at least part of a shape of each one of the moldable or formable edible or food articles composed of mozzarella cheese substantially conforming the at least part of the shape thereof to that of the recessed three dimensionally shaped article forming and holding compartment in which the moldable or formable edible or food articles composed of mozzarella cheese is thereafter held during storage and shipment.

18. The stackable tray system and moldable or formable edible or food article combination of claim 17, wherein each one of the recessed three dimensionally shaped article forming and holding compartments is elongate and has a arcuately-shaped bottom wall; wherein each one of the moldable or formable edible or food articles composed of mozzarella cheese extruded into a corresponding one of the recessed three dimensionally shaped article forming and holding compartments is molded or formed thereby into an elongate generally cylindrical mozzarella cheese log; and wherein the shape of the elongate generally cylindrical mozzarella cheese log becomes set therein.

19. The stackable tray system and moldable or formable edible or food article combination of claim 18, wherein each of the trays further comprises:
   a downwardly stepped full tray stacking interface formed into the upper surface defined by a plurality of guide edges;
   an inboard filled tray stacking land extending beneath the upper surface;
   wherein a first tray of the at least two trays is oriented 180° relative to a second tray of the at least two trays;
   wherein the second tray is stacked above the first tray to form a filled stacked tray assembly;
   wherein the downwardly stepped full tray stacking interface of the first tray abuts the inboard filled tray stacking land of the second tray; and
   wherein at least one article is received and retained in one of the recessed three dimensionally shaped article forming and holding compartments of the first tray and housed by the second tray stacked thereon.

20. The stackable tray system and moldable or formable edible or food article combination of claim 18, wherein the at least two trays are oriented 0° relative to one another and stacked forming an empty stacked tray assembly in which no moldable or formable edible or food article composed of mozzarella cheese is received in any one of the recessed three dimensionally shaped article forming and holding compartments of one of the at least two trays on which another one of the at least two trays is stacked;
   wherein the at least two trays are oriented 180° relative to one another and stacked forming a filled stacked tray assembly in which at least one moldable or formable edible or food article composed of mozzarella cheese received in one of the article-holding compartments of one of the at least two trays is retained therein and housed by another one of the at least two trays stacked thereon; and wherein the empty stacked tray assembly having a set number of trays has a height less than the filled stacked tray assembly having the same set number of trays.

21. A stackable transportable tray system in combination with a plurality of pairs of moldable or formable edible or food articles comprising:

at least two trays, each tray comprised of (a) an upper surface in which a plurality of pairs of generally parallel elongate recessed article-holding compartments are formed therein each configured to receive and retain an elongate moldable or formable edible or food article therein, (b) a plurality of spaced apart generally parallel sidewalls extending (i) generally parallel to the recessed article-holding compartments, and (ii) downwardly from the upper surface, and (c) a recessed filled tray stacking land disposed inboard of each one of the sidewalls;

wherein the stackable transportable tray system is configured so the trays (i) nest with one another when oriented 0° relative to one another such that each one of the generally parallel elongate recessed article-holding compartments of an upper one of the trays nests in a corresponding one of the generally parallel elongate recessed article-holding compartments of a lower one of the trays, and (ii) stack upon one another when oriented 180° relative to one another such that the generally parallel elongate recessed article-holding compartments of the upper one of the trays overlie and are oriented generally parallel to the generally parallel elongate recessed article-holding compartments of the lower one of the trays with the recessed filled tray stacking land of the upper one of the stacked trays resting on part of the upper surface of the lower one of the stacked trays providing a clearance space between the upper tray and any of the elongate moldable or formable edible or food articles received in any of the generally parallel elongate recessed article-holding compartments of the lower tray; and wherein the plurality of pairs of moldable or formable edible or food articles composed of cheese.

22. The stackable tray system and moldable or formable edible or food article combination of claim 21, wherein each one of the generally parallel sidewalls of each one of the trays extends downwardly below the recessed filled tray stacking land and defines a filled tray stacking skirt; wherein a portion of each one of the generally parallel sidewalls and adjacent upper surface of each one of the trays defines a filled tray stacking seating portion; and wherein each one of the filled tray stacking skirts of the upper one of the trays seats on a corresponding one of the filled tray stacking seating portions of the lower one of the trays when the upper one of the trays is stacked on and oriented 180° relative to the lower one of the trays.

23. The stackable tray system and moldable or formable edible or food article combination of claim 22, wherein a portion of each one of the generally parallel sidewalls defining a corresponding filled tray stacking skirt of the upper one of the trays overlaps an adjacent portion of a corresponding one of the generally parallel sidewalls defining a respective filled tray stacking seating portion of the lower one of the trays when the upper one of the trays is stacked on and oriented 180° relative to the lower one of the trays.

24. The stackable tray system and moldable or formable edible or food article combination of claim 1, wherein each of the at least two trays is forty-eight inches in length and forty inches in width.

25. The stackable tray system and moldable or formable edible or food article combination of claim 24, wherein each of the at least two trays is configured for being lifted by a forklift.

\* \* \* \* \*